United States Patent [19]

Van der Meer et al.

[11] 3,884,906
[45] May 20, 1975

[54] 2,2-METHYLENDEIPHENOLS PROCESSES OF PREPARING THE SAME, AND METHODS OF TREATING THEREWITH MAMMALS INFECTED WITH INTERNAL PARASITES

[75] Inventors: Samuel Van der Meer, Amstelveen; Hendrikus Matheus van Alphen, Purmerand, both of Netherlands

[73] Assignee: ACF Chemiefarma N.V., Maarssen, Netherlands

[22] Filed: Mar. 29, 1972

[21] Appl. No.: 239,341

[30] Foreign Application Priority Data
Apr. 9, 1971    Netherlands...................... 7104839

[52] U.S. Cl.......... 260/211 R; 260/491; 260/619 A; 424/180; 424/347; 424/348
[51] Int. Cl............................................. C07c 39/12
[58] Field of Search.......... 260/619 A, 567.5, 211 R

[56] References Cited
UNITED STATES PATENTS

| | | | |
|---|---|---|---|
| 2,544,826 | 3/1951 | Craige......................... | 260/619 A X |
| 2,615,052 | 10/1952 | Faith............................. | 260/619 A |
| 2,739,941 | 3/1956 | Chiddix et al. ............. | 260/619 A X |

OTHER PUBLICATIONS
Faith, J.A.C.S., Vol. 72 (1950) 837–839.

*Primary Examiner*—Bernard Helfin
*Attorney, Agent, or Firm*—Alvin Sinderbrand

[57]   ABSTRACT
Substituted 2,2′-methylenediphenols which are particularly effective in the treatment of mammals infected with internal parasites, such as, liver-fluke and schistosoma, and which also have anti-bacterial activity, for example, against *staphylococcus aureus*, have the formula:

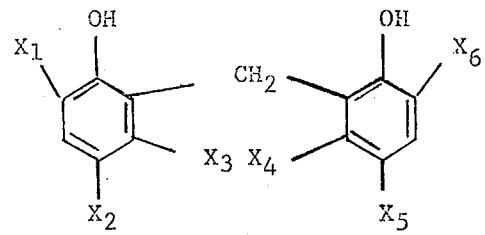

in which each of $X_1$ and $X_5$ represents a halogen atom or a nitro group, $X_2$ is a halogen atom, each of $X_3$ and $X_4$ is a halogen or hydrogen atom, and $X_6$ is a halogen or hydrogen atom or a nitro group, and further in which at least one of $X_1, X_5$ and $X_6$ is a nitro group and, if $X_1$ and $X_6$ each represent a nitro group, then $X_3$ is a halogen atom. Pharmacologically acceptable salts and esters of the foregoing substituted 2,2′-methylenediphenols are also disclosed.

The substituted 2,2′-methylenediphenols can be prepared by coupling of the two phenolic moieties by means of a methylene bridge either before or after the introduction of the necessary substituents. Such coupling can be achieved by condensation of a substituted saligenin or saligenin derivative with a phenol under the influence of a suitable condensing agent.

12 Claims, No Drawings

2,2-METHYLENDEIPHENOLS PROCESSES OF PREPARING THE SAME, AND METHODS OF TREATING THEREWITH MAMMALS INFECTED WITH INTERNAL PARASITES

The present invention relates generally to new 2,2'-methylenediphenols, to new compositions based on these compounds and to methods for preparing these compounds and compositions, and to the use of such compounds and compositions in combating parasites, especially internal parasites such as liver-fluke and schistosoma.

Fascioliasis, distomatosis, liver rot or liver-fluke infection is a disease which especially attacks sheep and cattle, but by which other warm-blooded animals and even humans may also be affected. The disease is caused by the liver-fluke (*Fasciola hepatica*), a parasite thriving in the liver and the biliary ducts of the infected animals and there causing damage by which the normal functioning of these organs is disturbed. The after-effect is a more or less serious decline in the general condition of the animals, which may even cause their death.

Fascioliasis not only has a negative influence on the condition of the animals suffering from it, but also the appearance and the achievements, for example, the milk-yield of cattle and the output of wool by sheep, are changed unfavorably. When the disease is not treated, the affected animals lose weight which leads to lower yields in slaughter cattle. For these reasons, fascioliasis and the fight against this disease have great economic and financial consequences for the cattle raising industry.

The search for new remedies against distomatosis has been intensified in the last few years. This has led to a number of proposed remedies among which may be mentioned, for example, the commercial products available under the tradenames HEPADIST and ACEDIST from ACF CHEMIEFARMA N.V. in the Netherlands. The active ingredients of these compounds are disclosed in British Pat. Nos. 1,001,229 and 1,122,244, respectively, having a common assignee herewith. Further new halogen containing 2,2'-methylenediphenols having activity against fascioliasis have been described in British Pat. No. 1,097,552, this patent also having a common assignee herewith and corresponding to U.S. Pat. No. 3,439,069. Other compounds with activity against fascioliasis have been disclosed, for example, in the following Dutch Pat. applications which have been laid open for public inspection: Ser. Nos. 64.05517 (Benzophenones), 64.09325 (benzanilide-derivatives), 66.00056 (thiocarbanilide), 67.06356 (thiosalicylanilides), 67.07849 (substituted salicylanilides), 69.00521 (nitroresorcylanilides), 69.11568 (phenylene-bis-dithiocarbamic acid esters) and 70.08304 (benzanilides) and in the Dutch Pat. Nos. 111,318, 114,112 and 114,113 (several sulphur compounds).

According to the present invention, it has now been found that a pronounced and particularly favorable activity against fascioliasis is exhibited by substituted nitro-2,2'-methylenediphenols having the formula

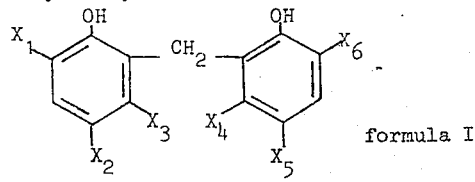

formula I in which: $X_1$ and $X_5$ each represent a halogen atom or a nitro group, $X_2$ represents a halogen atom, $X_3$ and $X_4$ each represents a halogen or hydrogen atom and $X_6$ represents a halogen or hydrogen atom or a nitro group, and further in which at least one of $X_1$, $X_5$ and $X_6$ is a nitro group and, when $X_1$ and $X_6$ each represents a nitro group, $X_3$ is a halogen atom, and also by the pharmacologically acceptable salts and esters of these compounds.

It has been found that the above compounds effectively attack the parasite even in low dosages or concentrations, and further some of the new compounds also have a good activity against the immature stages of the liver-fluke. Moreover the compounds according to the invention can be worked up simply into preparations which are easily administered to the affected animals. Thus, it has been found that, as compared with the halogen containing 2,2'-methylenediphenols of U.S. Pat. No. 3,439,069, the compounds according to this invention are active against fascioliasis or liver-fluke infection when administered in substantially lower dosages. Further, the compounds according to this invention can be worked up into injection liquids for convenient administration and this is an especially important advantage in connection with large-scale cattle-farming operations.

The preferred compounds according to this invention are those in which no more than two nitro groups appear, and in the case of compounds having two nitro groups, the latter are preferably arranged so that each of the phenyl groups has one nitro group as a substituent. It has further been found that, generally, compounds in which $X_6$ represents a halogen atom or a nitro group have a greater activity with regard to fascioliasis than those compounds in which $X_6$ is a hydrogen atom.

The compounds according to this invention have also been found to have activity against parasites which cause schistosomiasis. Schistosomiasis is a disease from which large numbers of people suffer in some Asian, African and South American countries. The disease is caused by infection with Schistosoma parasites, for example, *Schistosoma mansoni* and *Schistosoma japonicum*. These parasites live in the lymph and blood vessels of the infected persons and continuously produce eggs which are moved by the blood-stream and cling to certain organs causing serious damage in the long run.

In addition to the described activity against internal parasites, the compounds according to the invention also show anti-bacterial activity, especially against gram-positive bacteria, for example, against *Staphylococcus aureus*.

The new compounds according to the invention can be prepared by methods which are known per se for the preparation of similar compounds. In principle these methods consist in the coupling of the two phenolic moieties of the desired compounds by means of a methylene bridge, either before or after the introduction of one or more of the indicated substituents, and followed if desired by conversion of the product obtained into a pharmacologically acceptable salt or ester.

More specifically, the coupling of the two phenolic moieties is achieved by the condensation of a substituted saligenin or saligenin derivative of the formula

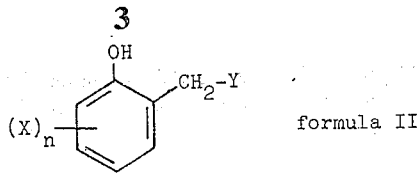

formula II in which $(X)_n$ represents one or more of the substituents $X_1$, $X_2$ and $X_3$ or $X_4$, $X_5$ and $X_6$, respectively, and Y represents a hydroxy or acyloxy group or a halogen atom, with a phenol of the formula

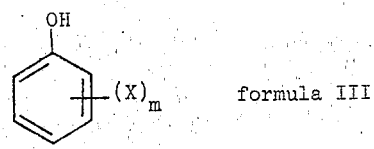

formula III in which $(X)_m$ represents one or more of the substituents $X_4$, $X_5$ and $X_6$ or $X_1$, $X_2$ and $X_3$, respectively, under the influence of a suitable condensing agent. Such condensing agent is a metal halide, preferably zinc chloride, in case Y is a halogen atom. In all other cases, an inorganic acid, preferably moderately concentrated sulfuric acid is used as the condensing agent. The condensation may be followed by the introduction of the substituent $X_6$ in those cases where such substituent was not present as a substituent in formula II or III.

As an alternative, the symmetrically substituted 2,2'-methylenediphenols according to the invention can also be prepared by the condensation of a phenol of formula III with formaldehyde in an acidic medium.

The starting products coming with the definition of formula II, and some of which are known compounds, can be obtained in general by the introduction of a halomethylgroup into a phenol of one or the other of the following formulas

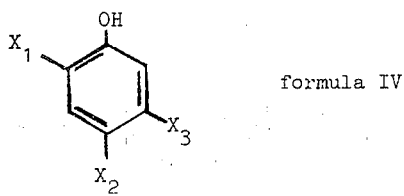

formula IV

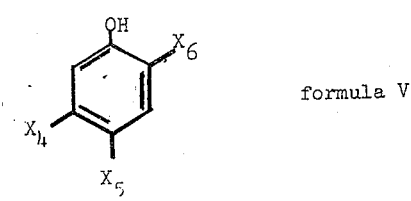

formula V in which $X_2$ and $X_5$ preferably are not iodine, followed, if the subsequent coupling has to be performed with a phenol having more than one negative substituent, by the substitution of the α-halogen by a hydroxy or an acyloxy, preferably an acetoxy group, or in case none of the substituents represent a nitro group, by the introduction of one or two hydroxymethyl groups into the respective phenol, followed by halogenation at a possibly still free ortho position with regard to the phenolic hydroxy group, and, in case two hydroxymethyl groups are present, by replacement of one of such hydroxymethyl groups by a nitro group.

The above mentioned substitution of the α-halogen atom by a hydroxy group is preferably carried out if the other ortho-substituent with respect to the phenolic OH-group in formula II does not represent a nitro group. On the other hand, if this substituent represents a nitro group, the α-halogen is preferably converted into an acyloxy group.

The conditions for the preparation of the starting compounds according to the above-described methods will be apparent to those skilled in the art. However, reaction conditions and the preferred methods in specific cases are disclosed in detail in the following examples which further disclose methods for the preparation of those starting compounds which have not been previously described.

With regard to the iodine-substituted compounds, it should be noted that these derivatives require special care. Iodine can best be introduced as the substituents $X_1$ and $X_6$ after the coupling in order to avoid the rather drastic conditions that are required for the preceding reactions and that might otherwise attack the iodine-substituent. Further, the starting products with a para-iodine substituent have to be stabilized before the coupling by the presence of an ortho nitro group. In case $X_2$ and $X_6$ in the final product both represent iodine, the $X_6$-substituent of the starting saligenin must be present prior to the condensation to prevent coupling of the saligenin with itself.

The new compounds according to the invention can be worked up in the usual way into pharmaceutical preparations having antiparasitic properties. Thus, tablets can be obtained according to methods known in pharmacy. For use in sheep, these tablets are preferably given an oblong form which makes it possible to administer the tablets with the use of a so-called pill-shooter. In making the tablets, the active component can be mixed with the usual pharmaceutical carriers and expedients such as lactose, amylum, talc, magnesium stearate, polyvinylpyrrolidone, and the like.

The new compounds according to the invention also can be administered in liquid forms, for example, in the form of suspensions and injectable fluids, or can be mixed with feed.

Pharmaceutically acceptable salts and esters of the 2,2'-methylenediphenols according to the invention also include suitable amine salts such as salts with methyl glucamine or ethyl glucamine. In order to obtain useful formulations containing these salts, approximately stoichiometric quantities of the diphenol and methyl glucamine can be mixed with propylene glycol, optionally in the presence of water. However, since the phenol groups are only weakly acidic it is often required to use an excess of glucamine.

In order to test the antiparasitic properties of the compounds according to the invention these compounds were subjected to the test method described by E. Lienert in Exp. Parasitol. 10, 223 (1960). According to this method rats, in which liver-flukes have been implanted subcutaneously, were treated with a single dose of the compounds according to the invention. In each case, the indicated dosage of the compound identified by its substituents in formula I was administered as a solution in an equivalent amount of an aqueous solution of sodium hydroxide. Three days after treatment the percentage of killed liver-flukes was determined. Some test animals are not treated in order to serve as controls. The results obtained are summarized in the following table.

Table I

Activity against liver-fluke of some compounds according to the invention after oral (p.o.), intramuscular (i.m.) or subcutaneous (s.c.) administration to rats and measured by the method of Lienert.

| Compounds administered | | | | | | Way of adm. | % of killed liver-flukes for Dose in mg/kg | | | | Controls |
|---|---|---|---|---|---|---|---|---|---|---|---|
| $X_1$ | $X_2$ | $X_3$ | $X_4$ | $X_5$ | $X_6$ | | 2.5 | 5 | 10 | 20 | |
| $NO_2$ | Cl | H | H | $NO_2$ | Cl | p.o. | — | — | 83 | 92 | 14 |
| $NO_2$ | Cl | H | H | $NO_2$ | Cl | i.m. | 50 | 64 | — | — | 11 |
| $NO_2$ | Cl | H | H | $NO_2$ | Br | p.o. | — | — | 89 | 100 | 14 |
| $NO_2$ | Cl | H | H | $NO_2$ | Br | i.m. | 45 | 74 | — | — | 6 |
| $NO_2$ | Cl | H | H | $NO_2$ | I | p.o. | — | 78 | 94 | — | 8 |
| $NO_2$ | Cl | H | H | $NO_2$ | I | i.m. | 53 | 83 | — | — | 17 |
| $NO_2$ | Cl | H | H | $NO_2$ | $NO_2$ | p.o. | — | 19 | 44 | 58 | 8 |
| $NO_2$ | Br | H | H | $NO_2$ | Cl | p.o. | — | — | 97 | 97 | 3 |
| $NO_2$ | Br | H | H | $NO_2$ | Br | p.o. | — | 22 | 61 | 75 | 8 |
| $NO_2$ | I | H | H | $NO_2$ | Cl | p.o. | — | — | 92 | 94 | 3 |
| $NO_2$ | Cl | Cl | Cl | Cl | $NO_2$ | p.o. | — | 86 | 89 | 92 | 11 |
| $NO_2$ | Cl | Cl | Cl | Cl | $NO_2$ | i.m. | 67 | 69 | — | — | 11 |
| $NO_2$ | Cl | H | H | Cl | I | i.m. | 28 | 28 | 42 | — | 6 |
| $NO_2$ | Cl | H | H | Br | Br | i.m. | 25 | 28 | 58 | — | 6 |
| $NO_2$ | Cl | H | H | Br | H | p.o. | — | 38 | 52 | 64 | 12 |
| $NO_2$ | Cl | H | H | Br | H | i.m. | 19 | 56 | — | — | 14 |
| Cl | Cl | Cl | Cl | Cl | $NO_2$ | p.o. | 31 | 61 | 69 | — | 14 |
| Cl | Cl | Cl | Cl | Cl | $NO_2$ | i.m. | 44 | 69 | — | — | 14 |
| Cl | Cl | Cl | H | Cl | $NO_2$ | p.o. | — | 35 | 81 | 90 | 14 |
| Cl | Cl | Cl | H | Cl | $NO_2$ | i.m. | 25 | 78 | 86 | — | 11 |
| Cl | Cl | Cl | H | Br | $NO_2$ | i.m. | 33 | 50 | 75 | — | 11 |
| Cl | Cl | Cl | H | $NO_2$ | Br | p.o. | — | — | 39 | 61 | 3 |
| I | Br | H | H | $NO_2$ | $NO_2$ | s.c. | 42 | 53 | 56 | — | 17 |

To illustrate the anti-schistosomal activity of the compounds according to the invention, some of these compounds were tested with the so-called Oogram method, described by Pellegrino and Katz, Ann. N.Y. Acad. Sci. 1969, 160, 429.

In accordance with this method, the compounds under test were administered to mice infected with *Schistosoma mansoni*. Three days after the end of treatment the animals were killed, the peritoneal cavities opened and the distal portion of the small intestine removed for examination for schistosome eggs. In the presence of drugs to be considered active, a progressive change was noted in the number of eggs and in the percentage of viable eggs in different stages of maturation in the intestinal wall. The eggs were counted and classified according to their developmental stages and the resulting "oogram" provided a simple, sensitive and reliable criterion for drug screening. A drug was considered "active" when one or more of the immature stages was absent.

The compounds in Table II, once again identified by their substituents in formula I, were administered as aqueous suspensions at the stated given dose (in mg/kg) for 5 successive days by the oral route. For each of the indicated compounds, "active" results were obtained.

TABLE II

| Compounds administered | | | | | | Dose | |
|---|---|---|---|---|---|---|---|
| $X_1$ | $X_2$ | $X_3$ | $X_4$ | $X_5$ | $X_6$ | | |
| $NO_2$ | Cl | Cl | Cl | Cl | $NO_2$ | 4.2 | |
| $NO_2$ | Cl | Cl | Cl | Cl | $NO_2$ | 4.2 | (repeat) |
| $NO_2$ | Cl | H | H | $NO_2$ | I | 40 | |
| $NO_2$ | Cl | H | H | $NO_2$ | I | 40 | (repeat) |
| Cl | Cl | Cl | H | Br | $NO_2$ | 250 | |
| $NO_2$ | Cl | H | H | $NO_2$ | Cl | 250 | |
| $NO_2$ | Cl | H | H | $NO_2$ | Cl | 150 | |

The invention is now further illustrated by the following examples.

EXAMPLE I 4,6'-dichloro-4',6-dinitro-2,2'-methylenediphenol

To a mixture of 55.5 g of α,4-dichloro-6-nitro-o-cresol (1) and 174 g of p-nitrophenol are added 3.5 g of zinc chloride at 130° C with stirring. After purification the 4-chloro-4',6-dinitro-2,2'-methylenediphenol (2) obtained melts at 223°–224° C (with decomposition). Yield 53 %. Thereupon 3.2 g of the compound thus obtained is dissolved in 50 ml glacial acetic acid. In this solution chlorine is introduced at the boiling point. The 4,6'-dichloro-4',6-dinitro-2,2'-methylenediphenol (3) obtained, after purification, melts at 190°–191° C. Yield 28 %.

EXAMPLE II 6-bromo-4'-chloro-4,6'-dinitro-2,2'-methylenediphenol

By bromination of compound (2) obtained according to example I in glacial acetic acid and at the boiling point 6-bromo-4'-chloro-4,6'-dinitro-2,2'-methylenediphenol (4) is obtained. After purification this compound melts at 201°–202° C. Yield 67 %.

EXAMPLE III 4-chloro-6'-iodo-4',6-dinitro-2,2'-methylenediphenol

To a mixture of 480 ml of ethanol, 96 ml of water and 30 ml of concentrated sulphuric acid is added with stirring a solution of 30 g of compound (2) obtained according to example, I, 7.2 g of sodium hydroxide, 20.4 g of potassium iodide and 15.6 g of potassium iodate in 600 ml of water, whereupon the whole mixture is stirred at 70° C for 3 hours. After purification the 4-chloro-6'-iodo-4',6-dinitro-2,2'-methylenediphenol (5) obtained melts at 223°–224° C (with decomposition). Yield 92 %.

EXAMPLE IV 4-chloro-4′,6,6′-trinitro-2,2′-methylenediphenol

To a solution of 5 g of compound (2) obtained according to Example I in 300 ml of glacial acetic acid is added a solution of 1.6 ml of nitric acid (100 %) in 25 ml of glacial acetic acid. After standing at room temperature for 24 hours the above-mentioned compound (6) is isolated. After purification it melts at 212°–213° C. Yield 68 %.

EXAMPLE V 4-bromo-6′-chloro-4′,6-dinitro-2,2′-methylenediphenol

The starting material for this compound, viz, 4-bromo-α-chloro-6-nitro-o-cresol (7), is prepared by chloromethylation of 4-bromo-2-nitrophenol and melts at 75°–77° C. It is condensed with p-nitrophenol in the same way as described in Example I but at a temperature of 110° C. The compound obtained, 4-bromo-4′,6-dinitro-2,2′-methylenediphenol (8) melts at 226°–227° C (with decomposition). Yield 82 %.

To a suspension of 3.7 g of the compound (8) thus obtained in 75 ml of glacial acetic acid and 5 ml of concentrated hydrochloric acid is added slowly 0.42 g of potassium chlorate at 55° C, whereupon the mixture is stirred for 9 hours at 55° C. After purification the 4-bromo-6′-chloro-4′,6-dinitro-2,2′-methylenediphenol (9) thus obtained melts at 184°–185° C. Yield 62 %.

EXAMPLE VI 4,6′-dibromo-4′,6-dinitro-2,2′-methylenediphenol

In a similar way as described in example II, however, starting from compound (8) obtained according to example V 4,6′-dibromo-4′,6-dinitro-2,2′-methylenediphenol (10) is obtained. Melting point 197°–198° C. Yield 86 %.

EXAMPLE VII 4-bromo-6′-iodo-4′,6-dinitro-2,2′-methylenediphenol

In a similar way as described in example III, however, starting from the compound (8) obtained according to example V 4-bromo-6′-iodo-4′,6-dinitro-2,2′-methylenediphenol (11) is obtained. Melting point 210°–211° C (with decomposition).
Yield 72 %.

EXAMPLE VIII 6-chloro-4′-iodo-4,6′-dinitro-2,2′-methylenediphenol

To a solution of 16 g of α,6-dichloro-4-nitro-o-cresol (12) in 150 ml of glacial acetic acid is added a solution of 32 g of sodium acetate in 150 ml of glacial acetic acid, whereupon the mixture is heated at 100° C for 4 hours. After purification the 3-chloro-5-nitrosaligenin α-acetate (13) obtained melts at 132°–133° C.
Yield 68 %.

To a homogeneous melt of 2.46 g of the compound (13) thus obtained and 3.31 g of 4-iodo-2-nitrophenol is added at 110°–120° C a mixture of 4 ml of concentrated sulphuric acid and 1 ml of water. The whole mixture is stirred for 30 minutes at 100°–110° C. After purification the 6-chloro-4′-iodo-4,6′-dinitro-2,2′-methylenediphenol (14) thus obtained melts at 211°–213° C (with decomposition).
Yield 49 %.

EXAMPLE IX 6-bromo-4′-iodo-4,6′-dinitro-2,2′-methylenediphenol

To a solution of 8.45 g of 5-nitrosaligenin (15) in 100 ml of glacial acetic acid is added at room temperature with stirring a solution of 2.8 ml of bromine in 25 ml of glacial acetic acid. After 4 hours the reaction product, for the greater part consisting of the acetic ester, is isolated and saponified with a 2 N sodium hydroxide solution. After acidification 3-bromo-5-nitrosaligenin (16) is obtained. Melting point 100°–102° C. Yield 80 %.

To a melt of 2.5 g of compound (16) thus obtained and 5.3 g of 4-iodo-2-nitrophenol is added with stirring at 125°–130° C a mixture of 3.5 ml of concentrated sulphuric acid and 1.5 ml of water, whereupon the whole mixture is stirred for 6 hours at 125°–130° C. After purification the 6-bromo-4′-iodo-4,6′-dinitro-2,2′-methylenediphenol (17) thus obtained melts at 217°–220° C (with decomposition). Yield 70 %.

EXAMPLE X 4,6′-diiodo-4′,6-dinitro-2,2′-methylenediphenol

To a solution of 8.45 g of 5-nitrosaligenin and 4 g of sodium hydroxide in 100 ml of water is added with stirring at room temperature a solution of 25.4 g of iodine and 25.4 g of potassium iodide in 50 ml of water. The excess of iodine is removed after three days. The solution is acidified and the 3-iodo-5-nitrosaligenin (18) isolated. After purification the melting point is 88°–90° C. Yield 62 %.

In a similar way as described in example IX condensation of the compound (18) thus obtained with 4-iodo-2-nitrophenol yields 4,6′-diiodo-4′,6-dinitro-2,2′-methylenediphenol (19). After purification the compound melts at 218°–226° C (with decomposition). Yield 61 %.

EXAMPLE XI 2,2′-methylenebis(3,4-dichloro-6-nitrophenol)

To a suspension of 46.8 g of 4,5-dichloro-2-nitrophenol (20) in a mixture of 75 ml of concentrated sulphuric acid and 13 ml of water are added with stirring in the course of 5 minutes 14.5 ml of a formaldehyde solution (35 %). Stirring is continued for 8 hours at 105° C. After purification the 2,2′-methylenebis(3,4-dichloro-6-nitrophenol) (21) obtained melts at 179°–180° C; after solidification the compound melts again at 195°–196° C (stable modification). Yield 81 %.

EXAMPLE XII 3,3′,4,6′-tetrachloro-4′,6-dinitro-2,2′-methylenediphenol

A mixture of 21.7 g of 4,5-dichloro-2-nitrophenol, 30 ml of concentrated sulphuric acid and 25 ml of bis(chloromethyl)ether is stirred for 15 hours at 65° C. The α,3,4-trichloro-6-nitro-o-cresol (22), after purification, melts at 47°–48° C. Yield 83 %.

To a solution of 25.7 g of the compound (22) thus obtained in 250 ml of glacial acetic acid is added a solution of 24.6 g of sodium acetate in 200 ml of glacial acetic acid, whereupon the mixture is boiled for 3½ hours. After purification the 5,6-dichloro-3-nitrosaligenin α-acetate (23) obtained melts at 94°–95° C. Yield 85 %.

To a homogeneous melt of 4.2 g of the compound (23) thus obtained and 3.9 g of 2,5-dichloro-4-nitrophenol is added with stirring at 110° C a mixture of 8 ml of concentrated sulphuric acid and 2 ml of water, whereupon stirring is continued for 3 hours at 110° C. After purification the 3,3′,4,6′-tetrachloro-4′,6-dinitro-2,2′-methylenediphenol (24) thus obtained melts at 165°–166° C. Yield 40 %.

EXAMPLE XIII 4,4′-dichloro-6-nitro-2,2′-methylenediphenol

To a suspension of 94.3 g of 5-chloro-2-hydroxy-m-xylene-α,α′-diol (25) in 750 ml of glacial acetic acid and 250 ml of water are added with stirring at room temperature in the course of 4 hours 138 g of sodium nitrite, whereupon stirring is continued for 4½ hours. The 5-chloro-3-nitrosaligenin (26) obtained, melts after purification, at 82°–84° C. Yield 70 %.

To a homogeneous melt of 20.4 g of the compound (26) thus obtained and 64.3 g of p-chlorophenol is added at 120° C a mixture of 25 ml of concentrated sulphuric acid and 25 ml of water. The mixture is stirred for 24 hours at 120° C. After purification the 4,4′-dichloro-6-nitro-2,2′-methylenediphenol (27) thus obtained melts at 134°–135° C. Yield 70 %.

EXAMPLE XIV 6-bromo-4,4′-dichloro-6′-nitro-2,2′-methylenediphenol

In a similar way as described in example II compound (27) obtained according to example XIII is brominated. The 6-bromo-4,4′-dichloro-6′-nitro-2,2′-methylenediphenol (28) obtained melts at 161°–162° C. Yield 60 %.

EXAMPLE XV 4,4′-dichloro-6-iodo-6′-nitro-2,2′-methylenediphenol

To a solution of 6.3 g of compound (27) obtained according to example XIII in 80 ml of 1 N sodium hydroxide solution is added at room temperature in the course of 45 minutes a solution of 5.1 g of iodine and 10.2 g of potassium iodide in 20 ml of water, whereupon the mixture is kept at that temperature for 4½ hours. After acidification the 4,4′-dichloro-6-iodo-6′-nitro-2,2′-methylenediphenol (29) obtained is isolated. Melting point after purification 161°–162° C. Yield 73 %.

EXAMPLE XVI 4,4′,6-trichloro-6′-nitro-2,2′-methylenediphenol

In a similar way as described in example XIII compound (26) is condensed with 2,4-dichlorophenol giving 4,4′,6-trichloro-6′-nitro-2,2′-methylenediphenol (30). Melting point 158°–160° C. Yield 15 %.

EXAMPLE XVII

4′-bromo-4-chloro-6-nitro-2,2′-methylenediphenol

To a mixture of 55 g of α,4-dichloro-6-nitro-o-cresol and 216 of p-bromophenol are added at 80° C 3.5 g of zinc chloride, whereupon the mixture is stirred for 21 hours at 80°–85° C. After purification the 4′-bromo-4-chloro-6-nitro-2,2′-methylenediphenol (31) obtained melts at 138°–139° C. Yield 53 %.

EXAMPLE XVIII 4,6-dibromo-4′-chloro-6′-nitro-2,2′-methylenediphenol

Bromination of compound (31), obtained according to example XVII, in glacial acetic acid at the boiling point gives 4,6-dibromo-4′-chloro-6′-nitro-2,2′-methylenediphenol (32). After purification this compound melts at 159°–160° C. Yield 70 %.

EXAMPLE XIX 4-bromo-4′-chloro-6-iodo-6′-nitro-2,2′-methylenediphenol

In a similar way as described in example XV compound (31) obtained according to example XVII is iodinated to 4-bromo-4′-chloro-6-iodo-6′-nitro-2,2′-methylenediphenol (33). Melting point 168°–169° C. Yield 80 %.

EXAMPLE XX 3,4,6-trichloro-4′-fluoro-6′-nitro-2,2′-methylenediphenol

To a solution of 12.8 g of 3,4,6-trichloro-4′-fluoro-2,2′-methylenediphenol (35) in 90 ml of glacial acetic acid is added at room temperature a solution of 1.7 ml of nitric acid (100 %) in 10 ml of glacial acetic acid. The mixture is kept for 1 day. After purification the 3,4,6-trichloro-4′-fluoro-6′-nitro-2,2′-methylenediphenol (36) thus obtained melts at 140°–141° C. Yield 80 %.

EXAMPLE XXI 3,4,4′,6-tetrachloro-6′-nitro-2,2′-methylenediphenol

In 150 ml of warm glacial acetic acid 10.15 g of 3,4,4′,6-tetrachloro-2,2′-methylenediphenol are dissolved, whereupon a solution of 1.3 ml of nitric acid (100 %) in 75 ml of glacial acetic acid is added at 15° C. After one day the 3,4,4′,6-tetrachloro-6′-nitro-2,2′-methylenediphenol (37) is isolated. After purification it melts at 151°–152° C. Yield 77 %.

EXAMPLE XXII

4′-bromo-3,4,6-trichloro-6′-nitro-2,2′-methylenediphenol

In a similar way as described in example XXI, however, starting from 4′-bromo-3,4,6-trichloro-2,2′-methylenediphenol the compound 4′-bromo-3,4,6-trichloro-6′-nitro-2,2′-methylenediphenol (38) is obtained. Melting point 159½°–161½° C. Yield 62 %.

EXAMPLE XXIII 3,4,6-trichloro-4′-iodo-6′-nitro-2,2′-methylenediphenol

To a homogeneous melt of 8.3 g of 3,5,6-trichlorosaligenin (34) and 10 g of 4-iodo-2-nitrophenol is added a mixture of 8 ml of concentrated sulphuric acid and 2 ml of water at 110° C, whereupon the mixture is stirred for 30 minutes at that temperature. After purification the 3,4,6-trichloro-4′-iodo-6′-nitro-2,2′-methylenediphenol (39) obtained melts at 194°–195° C. Yield 60 %.

EXAMPLE XXIV 3,4,6,6'-tetrachloro-4'-nitro-2,2'-methylenediphenol

In a similar way as described in example XXIII the compound 3,4,6,6'-tetrachloro-4'-nitro-2,2'-methylenediphenol (40) is obtained by condensation of compound (34) with 2-chloro-4-nitrophenol. After purification the compound melts at 186°–187° C. Yield 43 %.

EXAMPLE XXV 3,4,6-trichloro-4'-nitro-2,2'-methylenediphenol

In a similar way as described in example I, however, starting from α,3,4,6-tetrachloro-o-cresol (41) the above-indicated compound 3,4,6-trichloro-4'-nitro-2,2'-methylenediphenol (42) is obtained. After isolation the compound is purified with the aid of a sodium bicarbonate solution. Melting point 218°–220° C (with decomposition). Yield 80 %.

EXAMPLE XXVI

6'-bromo-3,4,6-trichloro-4'-nitro-2,2'-methylenediphenol

A solution of 7 g of compound (42), obtained according to example XXV, in 75 ml of glacial acetic acid is mixed with a solution of 2 ml of bromine in 25 ml of glacial acetic acid. This mixture is boiled for 1½ hour. After purification the 6'-bromo-3,4,6-trichloro-4'-nitro-2,2'-methylenediphenol (43) melts at 188°–189° C (with decomposition). Yield 73 %.

EXAMPLE XXVII 3,4,6-trichloro-6'-iodo-4'-nitro-2,2'-methylenediphenol

In a similar way as described in example III the iodination of compound (42) obtained according to example XXV yields 3,4,6-trichloro-6'-iodo-4'-nitro-2,2'-methylenediphenol (44). Melting point 210°–211° C (with decomposition). Yield 67 %.

EXAMPLE XXVIII 3,3',4,4',6-pentachloro-6'-nitro-2,2'-methylenediphenol

To a mixture of 27.6 g of compound (34) mentioned in example XXIII and 122 g of compound (20) mentioned in example XI a mixture of 53 ml of concentrated sulphuric acid and 10 ml of water is added in the course of 5 minutes at 100° C. Thereupon the mixture is stirred for 2 hours at 135° C. After purification the 3,3',4,4',6-pentachloro-6'-nitro-2,2'-methylenediphenol (45) obtained melts at 146°–147° C. Yield 62 %.

EXAMPLE XXIX 6-bromo-4-chloro-4',6'-dinitro-2,2'-methylenediphenol

To a mixture of 11.6 g of α-chloro-4,6-dinitro-o-cresol (46) and 32.2 g of p-chlorophenol are added 1.36 g of zinc chloride at 140°–145° C, whereupon the mixture is stirred for 7 hours at that temperature. The 4'-chloro-4,6-dinitro-2,2'-methylenediphenol (47) thus obtained can be used without further purification. Yield 33 %.

To a solution of 3.2 g of the compound (47) thus obtained in 15 ml of glacial acetic acid is added a solution of 0.6 ml of bromine in 20 ml of glacial acetic acid at boiling temperature, whereupon boiling is continued for 30 minutes. The 6-bromo-4-chloro-4',6'-dinitro-2,2'-methylenediphenol (48) obtained, after purification, melts at 188°–189° C. Yield 50 %.

EXAMPLE XXX 4,6-dibromo-4',6'-dinitro-2,2'-methylenediphenol (50)

In a similar way as described in example XXIX, however, starting from p-bromophenol the compound 4'-bromo-4,6-dinitro-2,2'-methylenediphenol (49) is obtained. Yield 30 %. In a similar way as described in example XXIX this intermediate (49) is brominated. Melting point after purification 191°–192° C. Yield 50 %.

EXAMPLE XXXI 4-bromo-6-iodo-4',6'-dinitro-2,2'-methylenediphenol

The intermediate (49) obtained according to the first part of example XXX is purified via its ammonium salt which is sparingly soluble in cold water. The purified diphenol (49) having a melting point of 184°–185° C is iodinated in a similar way as described in example III. After purification the 4-bromo-6-iodo-4',6'-dinitro-2,2'-methylenediphenol (51) thus obtained melts at 198°–199° C. Yield 60 %.

EXAMPLE XXXII 6-bromo-4'-fluoro-4,6'-dinitro-2,2'-methylenediphenol

To a homogeneous melt of 6.72 g of p-fluorophenol and 3.72 g of compound (16) obtained according to example IX are added 7.5 ml of sulphuric acid (50 %, v/v) at 90° C and with stirring. The mixture is stirred for another 6 hours at 90°–95° C. After purification the 6-bromo-4'-fluoro-4-nitro-2,2'-methylenediphenol (52) thus obtained melts at 187°–188° C. Yield 70 %.

A solution of 2.74 g of the compound (52) thus obtained in 50 ml of glacial acetic acid is mixed at 15° C with a solution of 0.4 ml of nitric acid (100 %) in 10 ml of glacial acetic acid. After keeping for 2 days the 6-bromo-4'-fluoro-4,6'-dinitro-2,2'-methylenediphenol (53) is isolated. After purification the compound melts at 175°–176° C. Yield 50 %.

EXAMPLE XXXIII 3,4,6-tribromo-6'-iodo-4'-nitro-2,2'-methylenediphenol

To a melt of 4.43 g of compound (18) obtained as described in example X and 9.93 g of 2,4,5-tribromophenol (54) is added with stirring at 125°–130° C a mixture of 5.3 ml of concentrated sulphuric acid and 2.2 ml of water, whereupon the whole mixture is stirred for 10 hours at 125°–130° C. After purification the 3,4,6-tribromo-6'-iodo-4'-nitro-2,2'-methylenediphenol (55) melts at 203°–205° C (with decomposition). Yield 31 %.

EXAMPLE XXXIV 4-chloro-6'-fluoro-4',6-dinitro-2,2'-methylenediphenol

To a homogeneous melt of 5.1 g of 5-chloro-3-nitrosaligenin (26) and 4.7 g of 2-fluoro-4-nitrophenol (56) is added a mixture of 8 ml of concentrated sulphuric acid and 2 ml of water at 110° C, whereupon the mixture is stirred for 2 hours at 110° C. After purification the 4-chloro-6'-fluoro-4',6-dinitro-2,2'-methylenediphenol (57) melts at 205°–206° C (with decomposition). Yield 65 %.

EXAMPLE XXXV

A mixture of 50 g of 6'-bromo-4-chloro-4',6-dinitro-2,2'-methylenediphenol, 258 g of lactose, 12 g of polyvinylpyrrolidone, 40 g of sodium bicarbonate, 14 g of talc, 7 g of sodium stearate and 19 g of amylum is granulated in the usual way. Thereupon the granulate obtained is worked up into 100 oblong tablets of 4 g each. In a similar way the other compounds according to the invention can be worked up into tablets.

EXAMPLE XXXVI

To a solution of 1.78 g of sodium hydroxide in 20 ml of water, propyleneglycol is added up to a volume of less than 100 ml. Thereupon, 10 g of 4-chloro-6'-iodo-4',6-dinitro-2,2'-methylenediphenol are added and dissolved with gentle heating. The clear solution is made up to 100 ml, by the further addition of propyleneglycol as needed, at room temperature and filtered sterile. The injection liquid thus obtained is kept in sterile vials. In a similar way the other compounds according to the invention may be worked up into injection liquids.

EXAMPLE XXXVII

Four sheep suffering from fascioliasis (average e.p.g. value 90; this e.p.g. value is the number of liver-fluke eggs per gram faeces) are treated with the injection liquid, obtained according to example XXXVI.

The individual single dose amounts to 5 mg of the active compound per kg body weight. One, two and three weeks after treatment the faeces of the sheep are free from eggs of the parasite.

EXAMPLE XXXVIII

In a similar way as described in example XXXVII, five sheep with an average e.p.g. value of 50 are treated with a single dose of 7.5 mg/kg with the aid of an injection liquid in which 3,4,4',6-tetrachloro-6'-nitro-2,2'-methylenediphenol is the active ingredient. One, two and three weeks after treatment the faeces of the animals are free from eggs of the parasite.

EXAMPLE XXXIX

In a similar way as described in example XXXVII, however, with a single dose of 2.5 mg/kg of 2,2'-methylenebis(3,4-dichloro-6-nitrophenol) five sheep with an average e.p.g. value of 58 are treated against distomatosis. One, two and three weeks after treatment the faeces of the animals are free from liver-fluke eggs.

EXAMPLE XL

To a mixture of 10 grams of 4-chloro-6'-iodo-4',6-dinitro-2,2'-methylenediphenol, obtained according to example III, and 4.5 g of Meglamine (a brand of N-methyl glucamine) are added 60 ml of propylene glycol. The mixture is heated to 60° C and stirred until a clear solution is obtained. After cooling to room temperature the solution is made up to 100 ml with propylene glycol and sterilized by filtration is a known manner. The solution obtained can be used as injection liquid.

EXAMPLE XLI

In the same way as described in example XL starting, however, from a mixture of 10 g of 4-chloro-6'-iodo-4',6-dinitro-2,2'-methylenediphenol and 9.5 g of Meglamine and using a mixture of equal parts of propylene glycol and water instead of pure propylene glycol a clear solution is obtained, which can be used as injection liquid.

EXAMPLE XLII

To a mixture of 15 g of Meglamine and 50 ml of water, 10 g of 4-chloro-6'-iodo-4',6-dinitro-2,2'-methylenediphenol are added at 60°C. The mixture is stirred until solution is complete and made up with water to 100 ml. The solution is sterilized by autoclaving at 115°C for 30 minutes to give an injection liquid which can be used to combat liver-fluke. The pH of the solution is 9.7.

Some of the compounds according to the invention have also been tested with regard to their antibacterial properties. The test used was a dilution test in which the minimum concentrations (in $\mu$ g/ml) were determined which inhibited all bacterial growth on a medium. The results are given in the following table, in which the various compounds are identified by their substituents in formula I.

Table III

Minimum inhibitory concentrations (in $\mu$ g/ml) against *Staphylococcus aureus* (Smith).

| $X_1$ | $X_2$ | $X_3$ | $X_4$ | $X_5$ | $X_6$ | Minimum concentration in $\mu$ g/ml |
|---|---|---|---|---|---|---|
| NO$_2$ | Cl | Cl | Cl | Cl | NO$_2$ | < 0.4 |
| NO$_2$ | Cl | H | H | NO$_2$ | I | 0.9 |
| Cl | Cl | Cl | H | Cl | NO$_2$ | 1.8 |
| Cl | Cl | Cl | H | F | NO$_2$ | < 0.4 |
| Cl | Cl | Cl | H | Br | NO$_2$ | < 0.4 |
| NO$_2$ | Cl | H | H | NO$_2$ | H | 1.8 |
| Cl | Cl | Cl | Cl | Cl | NO$_2$ | < 0.4 |
| NO$_2$ | Cl | H | H | NO$_2$ | Cl | < 0.4 |

What is claimed is:

1. A compound having activity against fascioliasis and which is selected from the group consisting of substituted 2,2'-methylenediphenols having the formula

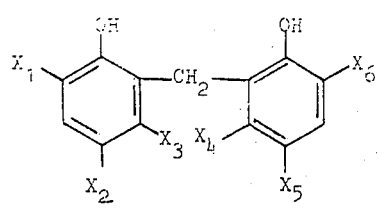

in which $X_1$ and $X_5$ are each selected from the group consisting of halogen and a nitro group, $X_2$ is a halogen atom, $X_3$ and $X_4$ are each selected from the group consisting of halogen and hydrogen, and $X_6$ is selected from the group consisting of halogen, hydrogen and a nitro group, and further in which at least one of $X_1$, $X_5$ and $X_6$ represents a nitro group and, in the event that each of $X_1$ and $X_6$ represents a nitro group, $X_3$ represents halogen and their salts with alkali metals or methyl and ethyl glucamines.

2. A compound according to claim 1, in which only one of $X_1$, $X_5$ and $X_6$ represents a nitro group.

3. A compound according to claim 1, in which $X_1$ and only one of $X_5$ and $X_6$ each represents a nitro group.

4. A compound according to claim 1, in which $X_6$ is selected from the group consisting of halogen and a nitro group.

5. A compound having activity against fascioliasis and which is selected from the group consisting of 6-bromo-4'-chloro-4,6'-dinitro-2,2'-methylenediphenol and its salts with alkali metals or methyl and ethyl glucamines.

6. A compound having activity against fascioliasis and which is selected from the group consisting of 4,6'-dibromo-4',6-dinitro-2,2'-methylenediphenol and its salts with alkali metals or methyl and ethyl glucamines.

7. A compound having activity against fascioliasis and which is selected from the group consisting of 4-chloro-6'-iodo-4',6-dinitro-2,2'-methylenediphenol and its salts with alkali metals or methyl and ethyl glucamines.

8. A compound having activity against fascioliasis and which is selected from the group consisting of 2,2'-methylenebis(3,4-dichloro-6-nitrophenol) and its salts with alkali metals or methyl and ethyl glucamines.

9. A compound having activity against fascioliasis and which is selected from the group consisting of 4,6'-dichloro-4',6-dinitro-2,2'-methylenediphenol and its salts with alkali metals or methyl and ethyl glucamines.

10. A compound having activity against fascioliasis and which is selected from the group consisting of 4-bromo-6'-chloro-4',6-dinitro-2,2'-methylenediphenol and its salts with alkali metals or methyl and ethyl glucamines.

11. A compound having activity against fascioliasis and which is selected from the group consisting of 4-bromo-6'-iodo-4',6-dinitro-2,2'-methylenediphenol and its salts with alkali metals or methyl and ethyl glucamines.

12. A compound having activity against fascioliasis and which is selected from the group consisting of 3,4,-4',6-tetrachloro-6'-nitro-2,2'-methylenediphenol and its salts with alkali metals or methyl and ethyl glucamines.

* * * * *